United States Patent Office 3,057,850
Patented Oct. 9, 1962

3,057,850
ANTI-TUMOUR COMPOUND
James Frederic Danielli and Leonard Newton Owen, London, England, assignors to National Research Development Corporation, London, England, a corporation of Great Britain and Northern Ireland
No Drawing. Filed July 7, 1958, Ser. No. 746,630
5 Claims. (Cl. 260—209)

The present invention relates to new compositions of matter having an anti-tumour activity.

Nitrogen mustards of, for example, the formula

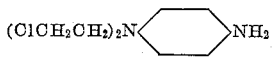

have an anti-tumour activity but they are unsatisfactory therapeutically as their action in non-selective so that they cause damage to normal tissues which is of the same order as the damage caused to tumours. It is an object of the present invention to provide compounds of the nitrogen mustard type which have a selectivity such that they are sufficiently non-toxic to be administered, for example, by intramuscular or intraperitoneal injection, in sufficient quantity to exert useful anti-tumour effect.

The new compositions of matter provided by the present invention comprise compounds having the general formula R—Q in which the group R has the general formula

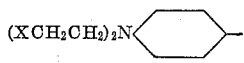

in which X represents a halogen atom and the group Q is selected from the class consisting of groups of the general formula —NH.CO.R$^2$, in which R$^2$ represents a group having its connecting valency on an aliphatic carbon atom which, when X represents a chlorine atom, contains at least one polyvalent atom in addition to said aliphatic carbon atom, and groups having the connecting valency on a sulphur atom, said compound having a molecular weight of more than 260 and said group R having a single occurrence in the molecule of the compound.

The invention includes within its scope injectable anti-tumour compositions comprising one or more of such compounds and a fluid carrier material, compatible therewith in which the compound(s) is/are dissolved or suspended.

The said compounds exhibit anti-tumour activity in varying degree, some of them acting as growth inhibitors when employed alone and others acting to cause actual regression. A class of compounds which is especially preferred on account of the high percentage of regressions obtained, and on account of their low toxicity are sulphur-containing compounds of the general formulae R.SH and R—Q$^1$ in which Q$^1$ represents an S-linked sulphur-containing acid group which has a constitution which renders it free from electrolytic dissociation or which is derivatised by a substituent group containing hydrogen atoms and from 1 to 4 polyvalent atoms which renders it free from electrolytic dissociation. Of these sulphur-containing compounds, those in which the group R contains bromine as its halogen constituent are especially preferred. Suitable S-linked groups include residues of mono basic thioacids such as thioacetic acid; residues of monothio dibasic acids such as carbonic acid in which one of the replaceable hydrogen atoms is substituted by an esterifying group for example, an alkyl group; and carbon-free acid groups such as sulphonic acid groups which have been derivatised by replacement of the hydroxyl group to convert them for example to amide groups or hydrazide groups.

Other compounds have only an inhibiting activity or give only a moderate percentage of regressions when used alone, but may nevertheless be used in conjunction with other compounds for producing a high percentage of regressions. Examples of such compounds are: (a) those of the general formulae

and

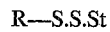

in which St represents a steroid group, derived from a naturally occurring or other steroid compound, preferably a hormonally active steroid compound such as cholesterol or cortisone. (b) Those of the general formula

in which R$^3$ represents an alkylene group such as a methylene group, and R$^4$ represents an alkyl group preferably containing from 1 to 4 carbon atoms, e.g., an ethyl group. (c) Those of the general formula

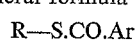

in which Ar represents an aromatic group which may be a substituted or non-substituted mono- or poly-nuclear aromatic group, preferably a phenyl group, and especially those in which the halogen in the group R is bromine. (d) Those of the general formula

in which R$^5$ represents the residue of a polyhydric alcohol, preferably a monosaccharide, which residue may have free hydroxyl groups, as with the glucosides or acylated hydroxyl groups, as for example with the tetracetyl glucosides. (e) Those of the general formula

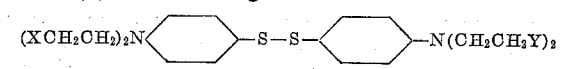

in which X represents a chlorine or bromine atom and Y represents a bromine atom.

The following examples in which all temperatures are expressed in degrees centigrade, and in which all references to percentage are to be taken as references to percentage by weight, are given in order to illustrate the invention.

*Example 1*

A solution of bromine (14.7 g.) and sodium bromide (5 g.) in dry methanol (50 cc.) was added (5–10 min.) to a stirred solution of NN-di-2'-chloroethylaniline (20 g., Robinson and Watt, J.C.S., 1934, 1536) and analytical grade ammonium thiocyanate (15.0 g.) in dry methanol (300 cc.) at ca. 5°. Stirring was continued for a further 10 min., and the mixture was then poured into water (1 l.) to precipitate NN-di-2'-chloroethyl-p-thiocyanatoaniline as a colourless solid (25.3 g., 100%), M.P. 40–41°. Recrystallisation from ethanol gave leaflets, M.P. 49°. (Found: C, 48.1; H, 4.6; N, 9.9. $C_{11}H_{12}N_2SCl_2$ requires C, 48.0; H, 4.4; N, 10.2%.)

*Example 2*

Chlorosulphonic acid (100 g.) was added cautiously to just molten, NN-di-2'-chloroethylaniline (50 g.), the reaction vessel being cooled in an ice-bath. When addition was complete the reaction mixture was heated on a steam for 30 minutes, allowed to cool to room temperature and poured carefully onto crushed ice (1 kg.) A greenish sticky solid separated which crystallised on scratching with a glass rod. The reaction product was extracted with chloroform (3 x 150 cc.) and the combined chloroform extracts washed with ice-water (1 x 100 cc.) and dried (Na$_2$SO$_4$). Removal of the chloroform under reduced pressure yielded a dark green oil which crystallised on cooling to a powdery cake of olive-green crystals. The product was dissolved in benzene and petroleum (60–80°) added until oily droplets started to separate; the solution was then heated to boiling, treated with animal charcoal and filtered through kieselguhr. This purification process was repeated twice more, the clear yellow filtrate allowed to cool slowly to room temperature and finally kept at 0° for 3 hours. The long, very pale-straw-coloured needles of p-(NN-di-2'-chloroethylamino)benzenesulphonyl chloride (31 g., 44%), M.P. 98–99° which deposited were collected, washed with cold petroleum (60–80°), and dried in a vacuum desiccator. Further recrystallisation from benzene-petroleum (60–80°) raised the M.P. to 102°. (Found C, 38.12; H, 3.93; Cl, 34.07; S, 10.69. $C_{10}H_{12}Cl_3NO_2S$ requires C, 37.93; H, 3.82; Cl, 33.59; S, 10.13%.)

Cholesterol was reacted with the recrystallised sulphonyl chloride in pyridine solution for 42 hours at room temperature to give cholesteryl p-(NN-di-2-chloroethylamino)benzenesulphonate, colourless needles, M.P. 149° $[\alpha]_D^{21}$ −27.5° (c.=1, CHCl$_3$), from ethanol. (Found: C, 66.56; H, 8.62; Cl, 11.06. $C_{37}H_{57}Cl_2NO_3S$ requires C, 66.64; H, 8.62; Cl, 10.65%.)

Example 3

A stirred solution of NN-di-2'-bromoethylaniline (30 g., Ross, J.C.S., 1949, 183), and ammonium thiocyanate (16 g.) in dry methanol (650 cc.) was treated, as described for the chloro-analogue in Example 1, with bromine (15.7 g.) and sodium bromide (8 g.) in methanol (80 cc.). The mixture was stirred for a further 20 min. and then poured into water. NN-di-2'-bromoethyl-p-thiocyanatoaniline was precipitated as colourless solid (33.8 g., 95%), M.P. 64–65°; recrystallisation of a portion from ethanol gave needles, M.P. 68°. (Found: C, 36.5; H, 3.65; N, 7.4. $C_{11}H_{12}N_2SBr_2$ requires C, 36.3; H, 3.3; N, 7.7%.)

Example 4

NN-di-2-bromoethyl-p-thiocyanatoaniline (10.0 g.) in warm ether (200 cc.) was reduced by addition to a suspension of lithium aluminium hydride (1.0 g.) in ether (100 cc.) at such a rate (30 min.) as to maintain gentle reflux. The mixture was then stirred and refluxed for a further 30 min. (by which time the initial pale yellow colour of the solution had disappeared), then cooled before the excess of reagent was decomposed by ice-water. The precipitated complex was decomposed by ice-cold 6 N-aqueous hydrochloric acid, the pH then brought to ca. 6 with saturated aqueous sodium hydrogen carbonate, the ether layer separated, and the aqueous solution re-extracted with ether (3 x 50 cc.). The combined, dried (Na$_2$SO$_4$) extracts were evaporated under nitrogen to yield an oil which crystallised on trituration with a little methanol. The solid thus obtained was washed with light petroleum (B.P. 40–60°) and dried in vacuo (22.4 g., 90%; M.P. 57–58°). Recrystallisation from ethanol-light petroleum (B.P. 40–60°) gave almost colourless prisms of p-(NN-di-2-bromoethylamino)thiophenol (8.95 g., 95%), M.P. 84–86°, raised to 88–89° on recrystallisation from ethanol. (Found: C, 36.0; H, 4.1; Br, 47.4; thiol-S, 9.3. $C_{10}H_{13}NSBr_2$ requires C, 35.4; H, 3.9; Br, 47.4; thiol-S, 9.5%.)

Example 5

3β-mercaptocholest-5-ene (4.83 g., O'Connor and Nace, J.A.C.S. 1953, 75, 2118), in dry benzene (30 cc.) was added dropwise with stirring to a solution of N-chlorosuccinimide (1.60 g.) in dry benzene (100 cc.) at 5–8°, with exclusion of light and moisture. Stirring was continued for 15 min. after addition was complete, and the mixture was allowed to attain room temperature before being filtered to remove succinimide (0.9 g.; M.P. 124–126°). A solution of p-(NN-di-2-chloroethylamino)thiophenol (3.0 g.) in dry benzene (10 cc.) was then added. A reaction occurred and hydrogen chloride was evolved; a pasty solid, presumably a mixture of hydrochlorides, separated. The mixture was heated to 50–60° for 10 min., then cooled, washed with saturated aqueous sodium hydrogen carbonate, dried (Na$_2$SO$_4$), and concentrated under reduced pressure to an oil, which was chromatographed on alumina (6 cm. x 30 cm.) with benzene-light petroleum (B.P. 60–80°) (1:1) as eluant.

The initial colourless eluates (1.25 l.) yielded di-(cholest-5-en-3β-yl) disulphide, which crystallised from acetone in pearly leaflets (2.1 g.), M.P. 143–144°. The very pale yellow eluates (500 cc.) that followed yielded an oil, a solution of which in propan-2-ol-ether slowly deposited colourless crystals of cholest-5-en-3β-yl p-(NN-di-2-chloroethylamino)-phenyl disulphide (2.02 g., 26%), M.P. 71–72°, $[\alpha]_D^{25}$ −36° (c. 2 in CHCl$_3$), (Found: C, 68.2; H, 8.9; Cl, 11.2. $C_{37}H_{57}NS_2Cl_2$ requires C, 68.3; H, 8.8; Cl, 10.9%.) A further small quantity of the mixed disulphide (0.5 g.) was obtained from the next eluates (500 cc.).

Elution of the residual slowly moving yellow band gave di - [p - (NN - di - 2 - chloroethylamino) - phenyl]-disulphide (1.4 g., 46%), M.P. 75–76° after recrystallisation from ethanol.

Example 6

NN - di - 2' - hydroxyethyltaurine (7.9 g.) and thionyl bromide (53 g.) were warmed together on a steam bath for 30 minutes. The excess of thionyl bromide was removed by distillation under reduced pressure and the residue was stripped down several times with benzene. The residual oil readily crystallised on trituration with ethanol to give pale yellow micro-prisms (10.4 g.) M.P. 187–188°. Rapid recrystallisation from methanol (350 cc.) gave NN-dibromoethyltaurine (8.2 g.), M.P. 190–191°. (Found: C, 22.17; H, 4.10; Br, 47.68.

requires C, 21.26; H, 3.86; Br, 47.15%.)

Example 7 p - (NN - di - 2 - bromoethylamino)thiophenol (2.0 g.) was dissolved in benzene (50 cc.), saturated sodium hydrogen carbonate (50 cc.) was added, and a solution of iodine in aqueous potassium iodide was gradually added until the iodine colour persisted. The benzene layer was washed with aqueous sodium thiosulphate solution, then dried and evaporated to an oil. Chromatographic purification gave a solid which crystallised from acetone-ethanol in lemon-yellow leaflets, M.P. 76–78°; recrystallisation from acetone-ethanol gave pure di-[p-(NN - di - 2' - bromoethyl - amino)phenyl]disulphide (1.4 g., 71%), M.P. 78–79°. (Found: C, 36.04; H, 3.95; Br, 47–07. $C_{20}H_{24}Br_4N_2S_2$ requires C, 35.52; H, 3.58; Br, 47.27%.)

Example 8

α-Acetobromoglucose (8.22 g.) was added to a solution of p - (NN - di - 2 - chloroethylamino)thiophenol (5.63 g.) and potassium hydroxide (1.10 g.) in chloroform-ethanol (1:2) (90 cc.). The solution was refluxed for 30 min., then cooled and washed with water; the chloroform layer was removed and the aqueous phase was re-extracted with chloroform. The combined extracts were washed with saturated aqueous sodium hydrogen carbonate and with water, dried (Na$_2$SO$_4$) and concentrated to give a solid (7.2 g., 62%), M.P. 110–112°. Recrystallisation from ethanol gave p-(NN-dichloroethylamino)phenyl 2:3:4:6 - tetra - O - acetyl - β-D-thioglucoside, colourless needles, M.P. 110–111°, $[\alpha]_D^{22}$ −44° (c. 2 in CHCl$_3$). (Found: C, 49–7; H, 5.4; Cl, 12.1. $C_{24}H_{31}O_9NSCl_2$ requires C, 49.7; H, 5.4; Cl, 12.2%.)

Example 9

The 2:3:4:6-tetra acetyl thioglucoside obtained in Example 8 (2.02 g.) was suspended in anhydrous methanol, and a small piece of sodium (ca. 5 mg.) was added. The flask was sealed, swirled until all the solid had dissolved, and then kept overnight at 0°. The solution was neutralised with carbon dioxide and evaporated to an oil which on crystallisation from ethanol-pentane gave p - (NN - di - 2 - chloroethylamino)phenyl - β-D-thioglucoside, needles (1.09 g., 76%), M.P. 85–87°, $[\alpha]_D^{22}$ —40° (c. 2 in pyridine). (Found: C, 46.8; H, 5.7; Cl, 17.4. $C_{16}H_{23}O_5NSCl_2$ requires C, 46.6; H, 5.6; Cl, 17.2%.)

*Example 10*

A solution of ethyl malonyl chloride (0.83 g.) in chloroform (10 cc.) was added to NN-di-2-chloroethyl-p-phenylenediamine (from 3 g. of its hydrochloride) in chloroform (50 cc.) containing triethylamine (1.1 g.). The mixture was boiled under reflux for 10 min., cooled, and washed with water. Removal of chloroform from the dried solution, and recrystallisation of the residue from ethanol-petroleum gave white needles (3.0 g.) of the above derivative, M.P. 87–88°. (Found: C, 51.8; H, 5.9; N, 8.4. $C_{15}H_{20}O_3N_2Cl_2$ requires C, 51.9; H, 5.8; N, 8.1%.)

*Example 11*

Chlorosulphonic acid (60 cc.) was added slowly to a vigorously stirred, ice-cooled solution of NN-di-2'-bromoethylaniline (55 g.) in carbon tetrachloride (20 cc.). When the addition was complete, the reaction mixture was heated in an oil-bath at 120–130° for 6 hours. The deep red liquid thus obtained was cooled, cautiously poured onto crushed ice and extracted with chloroform (3 x 500 cc.). The combined chloroform extracts were washed once with water, dried ($MgSO_4$) and concentrated to about 80 cc. when addition of light petroleum (250 cc., B.P. 60–80°) precipitated a pale yellow crystalline solid (46 g.). Recrystallisation from chloroform-light petroleum gave p - (NN - di - 2 - bromoethylamino)-benzenesulphonyl chloride, (40 g., 55%), M.P. 103–105°, raised to 106° on further recrystallisation from the same solvent. (Found: C, 29.70; H, 2.96; S, 8.12. $C_{10}H_{12}O_2NSClBr_2$ requires C, 29.61; H, 2.98; S, 7.90%). Aqueous ammonia (15 cc., 0.880) was added to a stirred solution of the sulphonyl chloride (5.0 g.) in acetone (20 cc.). After 10 minutes, the solution was poured into an excess of water. The fine crystalline precipitate was collected, dried and recrystallised from chloroform to give p - (NN - di - 2 - bromoethylamino)benzenesulphonamide (3.5 g., 74%), M.P. 116–117°, raised to 117.5–118° on further recrystallisation from the same solvent. (Found: C, 30.93; H, 3.88; Br, 41.49. $C_{10}H_{14}O_2N_2SBr_2$ requires C, 31.10; H, 3.66; Br, 41.39%.)

*Example 12*

Three grams of the sulphonyl chloride obtained in Example 11 was added to a stirred solution of hydrazine hydrate (8 cc., 90%) in ethanol (40 cc.). After 10 minutes, the semi-crystalline mass was diluted with water (100 cc.), filtered, washed with more water, and dried (2.6 g.) M.P. 138–139°. Recrystallisation from chloroform gave p - (NN - di - 2 - bromoethylamino)-benzenesulphonhydrazide as colourless plates (2.1 g., 69%), M.P. 141.5°. (Found: C, 29.67; H, 3.81; N, 10.44. $C_{10}H_{15}O_2N_3SBr_2$ requires C, 29.94; H, 3.77; N, 10.48%.)

*Example 13*

A solution of p-(NN-di-2-chloroethylamino)thiophenol (6.0 g.) in acetic anhydride (35 cc.) and pyridine (3 cc.) was heated for 3 hours on a steam-bath under nitrogen, then cooled and poured into water (800 cc.). The precipitated solid on recrystallisation from ethanol (charcoal) gave the thiolacetate, pale yellow prisms (4.2 g., 60%), M.P. 63–64°, raised to 64–65° on further recrystallisation from ethanol. (Found: C, 49.6; H, 5.4; Cl, 24.4. $C_{12}H_{15}ONSCl_2$ requires C, 49.3; H, 5.2; Cl, 24.3%.)

This thiolacetate (5 g.), lithium bromide (7 g.), and methyl isobutyl ketone (30 cc.) were refluxed together for three hours. The product was diluted with chloroform (100 cc.), washed with water (5 x 100 cc.), dried ($MgSO_4$) and evaporated to give an oil which crystallised from ethanol (4.5 g., 69%), M.P. 66–67°. Recrystallisation from light petroleum (B.P. 60–80°) gave very pale yellow needles of p-(NN-di-2-bromoethylamino)phenyl thiolacetate, M.P. 70°. (Found: C, 37.70; H, 4.21; Br, 41.80. $C_{12}H_{15}ONSBr_2$ requires C, 37.82; H, 3.97; Br. 41.72%.)

*Example 14*

A solution of p-(NN-di-2-chloroethylamino)thiophenol (5.0 g.) and benzoic anhydride (5.0 g.) in pyridine (30 cc.) was set aside overnight and then diluted with water (100 cc.). The precipitated solid, on recrystallisation from acetone-ethanol gave the S-benzoyl derivative, pale yellow prisms (6.1 g. 86%), M.P. 109–110°. (Found: C. 57.4; H, 5.1; Cl, 20.1. $C_{17}H_{17}ONSCl_2$ requires C, 57.6; H, 4.8; Cl, 20.0%.)

The above thiolbenzoate (6.1 g.), lithium bromide (6.0 g.) and methyl isobutyl ketone (30 cc.) were refluxed together for 4 hours. The product was worked up as described above for the thiolacetate of Example 13. Concentration of the chloroform extract gave a crystalline residue which was crystallised from chloroform-ethanol to give p-(NN-di-2-bromoethylamino)phenyl thiolbenzoate as pale yellow needles (6.3 g., 82%), M.P. 110–111°. (Found: C, 46.07; H, 3.97; Br, 36.34. $C_{17}H_{17}ONSBr_2$ requires C, 46.05; H, 3.87; Br, 36.07%.) Light absorption: 2390 A., $\epsilon=14,200$ and 2740 A., $\epsilon=32,800$.

*Example 15*

Potassium hydroxide (1.6 g.) in ethanol (8 cc.) was added to p-(NN-di-2-chloroethylamino)thiophenol (7.1 g.) in chloroform (50 cc.), followed immediately by a solution of isopropyl chloroformate (3.5 g.) in chloroform (30 cc.). The mixture was stirred for 4 hours, then filtered from potassium chloride and evaporated to a solid. Recrystallisation from methanol furnished S-p-(NN - di - 2 - chloroethylamino)phenyl O - isopropyl thiolcarbonate, M.P. 86°. (Found: C, 50.7; H, 5.6; N, 4.4. $C_{14}H_{19}O_2NSCl_2$ requires C, 50.0; H, 5.7; N, 4:2%.)

Reaction of the crude unrecrystallised product with lithium bromide (7.4 g.) in boiling isobutyl methyl ketone (130 cc.) for 4 hours, followed by dilution with chloroform, washing with water, drying, and evaporation, gave S-p-(NN-di-2-bromoethylamino)phenyl O-isopropyl thiolcarbonate (8.4 g.), M.P. 103° (recrystallised from methanol). (Found: C, 39.9; H, 4.7; N, 3.4; $C_{14}H_{19}O_2NSBr_2$ requires C, 39.5; H, 4.5; N, 3.3%.)

*Example 16*

The "chloro-mustard" tetra-acetyl thioglucoside of Example 8 (4 g.), lithium bromide (8 g.) and methyl isobutyl ketone (25 cc.) were heated together under reflux for 5 hours. The product was worked up as described above to give a yellow oil. This was taken up in hot isopropanol and cooled overnight at 0° C. to give S-p-(NN-di-2-bromoethylamino)phenyl 2:3:4:6-tetra - O - acetyl-β-D-thioglucoside, colourless prisms (3.5 g., 76%), M.P. 119–120°. (Found: O, 21.2; Br, 23.6; $C_{24}H_{32}O_9NSBr_2$ requires O, 21.5; Br, 23.6%.)

The compounds prepared in the foregoing examples were tested by examining their reaction against Walker rat sarcoma 256 grown in Wistar rats. The tumour was implanted in the flank of the rat. When the tumour had grown to a weight of approximately 5 grams the drugs were administered in amounts of up to ⅓ of the median lethal dose by intramuscular or intraperitoneal injection of preparations in water or in arachis oil, depending on the solubility, daily for 5–10 days, administration being terminated when the tumour had ceased to grow. In those cases in which regression was obtained the tumour decreased continuously after the course of injections and had disappeared completely within one month. The following results were obtained:

Growth inhibition obtained with products of Examples 2, 5, 7, 10, 14 and 16.

30–80% regressions obtained with products of Examples 3, 6 and 9.

80 to 100% regressions obtained with products of Examples 4, 11, 12, 13 and 15.

Separate experiments showed that the median lethal dose in Wistar rats is greater than 400 mg./kg. for all the compounds except that of Example 6 where, nevertheless, it is greater than 300 mg./kg. In the case of the compounds of Examples 2, 4 and 5 it is greater than 500 mg./kg.

The compounds of the present invention exert their toxic actions in various different ways, and it is frequently possible to select from the series two or more compounds having different toxic mechanisms, which when used together show an increased anti-tumour effect, which is obtained without increasing the overall toxic effect.

We claim:

1. An anti-tumour composition comprising at least one compound of the formula

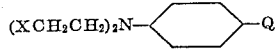

wherein X represents a halogen atom and Q is a radical selected from the group consisting of —SH, —SO$_2$NH$_2$, —SO$_2$NH.NH$_2$ and a thioglucoside group.

2. p - (NN - di - 2 - chloroethylamino) phenyl β-D-thioglucoside.

3. p-(NN-di-2'-bromoethylamino) thiophenol.

4. p - (NN-di - 2 - bromoethylamino) benzenesulphonamide.

5. p-(NN-di - 2 - bromoethylamino) benzenesulphonhydrazide.

References Cited in the file of this patent

Haddow et al.: Nature, vol. 162, pp. 824–825 (1948).
Everett et al.: J. Chem. Soc. (London), Pt. III, pp. 1972–1983 (1949).